(12) United States Patent
Kaminski et al.

(10) Patent No.: US 10,318,450 B2
(45) Date of Patent: Jun. 11, 2019

(54) EFFICIENT CONTEXT BASED INPUT/OUTPUT (I/O) CLASSIFICATION

(71) Applicant: Intel Corporation, Santa Clara, CA (US)

(72) Inventors: Maciej Kaminski, Gdansk (PL); Piotr Wysocki, Gdansk (PL); Mariusz Barczak, Gdansk (PL)

(73) Assignee: Intel Corporation, Santa Clara, CA (US)

(*) Notice: Subject to any disclaimer, the term of this patent is extended or adjusted under 35 U.S.C. 154(b) by 351 days.

(21) Appl. No.: 15/201,056

(22) Filed: Jul. 1, 2016

(65) Prior Publication Data

US 2018/0004690 A1    Jan. 4, 2018

(51) Int. Cl.
*G06F 13/18* (2006.01)
*G06F 13/364* (2006.01)
*G06F 13/16* (2006.01)

(52) U.S. Cl.
CPC .......... *G06F 13/18* (2013.01); *G06F 13/1663* (2013.01); *G06F 13/1694* (2013.01); *G06F 13/364* (2013.01)

(58) Field of Classification Search
CPC ...................................................... G06F 13/18
See application file for complete search history.

(56) References Cited

U.S. PATENT DOCUMENTS

| | | | |
|---|---|---|---|
| 2004/0139433 A1* | 7/2004 | Blythe | G06F 9/505 718/100 |
| 2005/0183084 A1* | 8/2005 | Cuomo | G06F 9/505 718/100 |
| 2006/0015512 A1* | 1/2006 | Alon | H04L 47/10 |
| 2008/0080515 A1* | 4/2008 | Tombroff | G06F 9/50 370/394 |

* cited by examiner

*Primary Examiner* — Farley Abad
(74) *Attorney, Agent, or Firm* — Thorpe North & Western, LLP

(57) ABSTRACT

Technology for an apparatus is described. The apparatus can include a memory controller with circuitry configured to define a caching and processing priority policy for one or more input/output (I/O) request class types. The memory controller can monitor one or more I/O contexts of one or more I/O requests. The memory controller can associate the one or more I/O contexts with one or more I/O class types using an I/O context association table. The memory controller can execute the one or more I/O requests according to the caching and processing priority policy of the one or more I/O class types. The apparatus can include an interface to the memory controller.

28 Claims, 9 Drawing Sheets

EFFICIENT CONTEXT BASED INPUT/OUTPUT (I/O) CLASSIFICATION

BACKGROUND

Given the complexity of computer systems, data, and the processing of data, challenges may arise for a computer storage system in attempting to differentiate between specific data types. In addition, computer storage systems are often unable to differentiate between classes of data or metadata due to limitations on the type of interface (e.g., a block interface), and the lack of a specific data-distinguishing mechanism. Thus, the computing performance may be negatively impacted.

BRIEF DESCRIPTION OF THE DRAWINGS

Features and advantages of various embodiments will be apparent from the detailed description which follows, taken in conjunction with the accompanying drawings, which together illustrate, by way of example, embodiment features, wherein.

Figure 1:
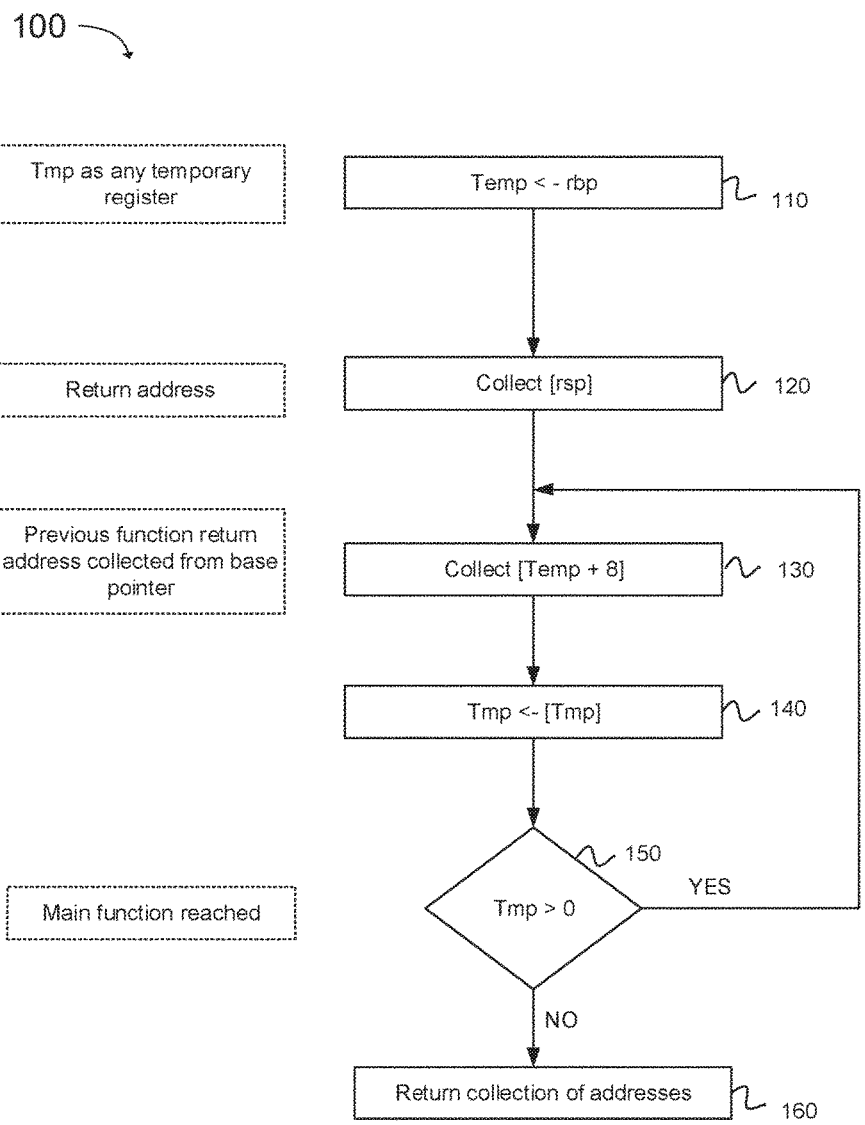
FIG. 1 is a block diagram of an input/output (I/O) call context extraction operation in accordance with an example embodiment.

Reference will now be made to the exemplary embodiments illustrated, and specific language will be used herein to describe the same. It will nevertheless be understood that no limitation on disclosure scope is thereby intended.

DESCRIPTION OF EMBODIMENTS

Before the disclosed embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various technology embodiments. One skilled in the relevant art will recognize, however, that such detailed embodiments do not limit the overall inventive concepts articulated herein, but are merely representative thereof.

As used in this written description, the singular forms "a," "an" and "the" include express support for plural referents unless the context clearly dictates otherwise. Thus, for example, reference to "a bit line" includes support for a plurality of such bit lines.

Reference throughout this specification to "an example" means that a particular feature, structure, or characteristic described in connection with the example is included in at least one invention embodiment. Thus, appearances of the phrases "in an example" or the like in various places throughout this specification do not necessarily all refer to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that embodiments can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this written description, like "comprising" or "including," it is understood that express support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," "improved," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a process that provides "improved" efficiency is a process that requires less time or energy to perform the process than to perform the same or a similar state of the art process. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Example Embodiments

An initial overview of various embodiments is provided below and then specific embodiments are described in further detail later. This initial summary is intended to aid readers in understanding the technology more quickly, but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

In order to meet the high demands of computing efficiency and workload performance, computer storage systems are well served to differentiate between types of data and data accessing patterns. For example, some data files can be primarily accessed according to a random access pattern, while other data files can be accessed in a sequential pattern. Alternatively, some data files can be accessed repeatedly, while others data files can be written and rarely accessed thereafter. Even within a single computer application there can be different data access patterns, for example, a relational database management system (RDBMS) can use different data access patterns for indexes, tables, and/or transaction logs.

Accordingly, as described herein, various embodiments provide for differentiating between data types by determining various classes of read or write requests (e.g., input/output (I/O) requests that can be a disk operation) and servicing the I/O requests according to a specific I/O class type. In some embodiments, various classes of storage I/O requests can be differentiated without altering other applications, such as, for example, database, web server, and/or graphic applications. This allows a storage system to service specific classes of I/O requests differently and provide desired quality of service (QoS) characteristics.

In one aspect, an application context of read and/or write requests (I/O requests) can be monitored. The application context can refer to data used by a task that may define an initial configuration and/or execution state of that task (e.g. a process or a job for an application). In some embodiments, an I/O request classification engine can be used to learn how to associate the application contexts with specific kinds of I/O requests. For example, the classification engine can learn that an I/O request from a particular context accesses data sequentially or that an I/O request from another context randomly accesses data. In some embodiments, a cache engine can be in association with the I/O request classification engine and can analyze the data and assign appropriate caching/processing policies and priorities to any subsequent I/O requests. In one aspect, the I/O classification engine can be used in and/or applied to: 1) a Redundant Array of Independent Disks (RAID) on a central processing unit (CPU), or 2) caching and storage tiering mechanisms. Such application can provide an increase in performance and improve QoS characteristics, which can include the ability to meet certain service level agreements (SLAs) as needed.

In one aspect, performance of applications can be improved or enhanced by assigning higher priorities to contexts where an application can achieve increased efficiency through caching, such as, for example, assigning an increased priority to a call from a context for random access. These qualities can be achieved without altering an application (e.g. no external hinting is needed), although in some embodiments altering an application in combination with the present mechanisms can provide other advantages. The present embodiments additionally provide for determining one or more I/O classes of I/O requests without pre-configuration to provide more efficient and intelligent caching. For example, a more efficient storage caching performance can be achieved due to an increased hit ratio and increased presence of random access traffic, which can benefit from being cached, for example, on a solid-state drive. Additional embodiments are described herein for providing flexible I/O classifications capable of differentiating between I/O classes within an application without altering the application itself, thus improving performance, such as increased throughput and/or decreased latency or key enterprise workloads.

Differentiating between the various data types by determining various classes of I/O requests and servicing the I/O requests according to a specific I/O class overcomes various limitations such as an inability to differentiate between classes of data or metadata. These limitations can occur due to the type of interface that is used, such as a block interface, and the fact that the type of interface does not provide a mechanism to distinguish between the classes of data. Specifically, current computer storage systems are unable to differentiate between the various data types by determining various classes of I/O requests because the I/O requests (e.g., read/write) that are passed to storage systems pass only address and sequence bytes. No metadata regarding the data type or class are passed for the address and sequence bytes.

Thus, in an additional aspect, various embodiments provide for a system and/or method under control of at least one processor and/or memory configured with executable instructions. The executable instructions can define a variety of operations or relationships. For example, the executable instructions can dictate caching and processing priority policies for one or more I/O request class types, and analyze one or more I/O contexts of one or more I/O requests. Additionally, the executable instructions can associate the one or more I/O contexts with one or more I/O class types using an I/O context association table for executing the one or more I/O requests according to the caching and processing priority policies. Further, the executable instructions can execute the one or more I/O requests according to the caching and processing priority policies of the one or more I/O class types. Additionally, the executable instructions can update the I/O context association table according to the one or more I/O contexts and metadata of the one or more I/O requests that have been processed. This allows an update of the caching and processing priority policies for executing subsequent I/O requests, as well as execution of subsequent I/O requests according to updated caching and processing priority policies.

It should be noted the I/O requests can be classified into one of several class types. For example, in one aspect, for a database application, one or more I/O requests may be classified according to I/O operations pertaining to a transaction log, a temporary table, a system table, a free space map, a random/sequential user table, and/or an index file. In an additional aspect, for a graphics application, one or more I/O requests may be classified according to texture, a map, and/or a mesh keyframe. In an additional aspect, for general computing systems, one or more I/O request class types may include I/O operations pertaining to an application I/O, a large file I/O, a small file I/O, a filesystem superblock, and/or a directory. In short, a "request class" or "type" can refer to a purpose for which data is being accessed, context within which it is accessed, and/or a type of data that is being accessed, such as for example, a type of file (i.e. graphics or text).

In one aspect, various embodiments provide for differentiating between various classes of storage I/O requests without altering one or more computing applications associated with the I/O requests. This allows an I/O and/or a computing storage system to service different classes of I/O requests differently and provide desired quality of service (QoS) characteristics. In addition, performance can be increased for applications, such as databases, web servers, and/or graphics, by differentiating between different kinds of I/O requests issued by an application and by assigning higher priorities to I/O contexts where an application can achieve the most benefit from caching, such as, for example, random access I/Os requests. As previously mentioned, these qualities can be achieved without altering the application and eliminating constraints for external hinting (e.g., autotuning capability for tuning identified performance bottlenecks). It should also be noted that manual configuration of I/O contexts/classes is unconstrained.

An operational illustration of an embodiment is as follows. When an I/O request is issued, one or more functions can be called. In one aspect, a function can refer to a section of programming code callable by other code and encompasses subroutines in a Fortran language, procedures in the Pascal language, methods in the C++ or Java language, and other similar constructs used for computer programming. The functions called can include, for example, a read, a write, pread, pwrite, ready, and/or a preadv function call. In one aspect, each of these functions can be wrappers around one or more system calls. A call stack can be used for each function call. The call stack can be a designated portion of memory that can hold the data exchanged between each invoking function and each invoked function. A computing environment may utilize such a call stack for storing data between such function invocations. In one aspect, a computing system may utilize a plurality of call stacks simultaneously for various purposes (e.g., for storing different kinds of data, and/or for storing call stack data between different processes.) Upon a function invocation, the operating environment can create a call stack frame on the call stack, comprising the set of information described above stored in a predetermined manner and order, on the "top" of the call stack. Eventually the "called" function terminates, and processing control is returned to the invoking function, while the call stack frame is removed from the call stack. In turn, the invoked function may invoke other functions, resulting in the allocation of call stack frames "above" the call stack frame of the invoked function that are removed upon termination of the functions invoked by the invoked function. Hence, the call stack can operate as a "last-in, first-out" data structure, wherein the first call stack frame "pushed" onto the call stack is the last one "popped" off of the call stack, and the second call stack frame "pushed" onto the call stack (on "top" of the first call stack frame) is removed from the call stack before the first one can be removed, etc. The computer system components that manage access to the call stack (e.g., the memory allocation in execution of the "pushing" and "popping" operations) can also track the "top" of the call stack, (i.e., the memory address of free space that may be used for the next "pushed" data). This memory address can be tracked by storing it in a stack pointer, which may be a register and/or a data object stored elsewhere in system memory.

Simply stated, when a function call is executed, the arguments can be evaluated to values and control flow jumps to the body of the function, and code begins executing there. More specifically, when a function is called according to an issued I/O request, and a "call instruction" is used, a return address can be pushed on the stack. The address following the call can be pushed to the stack, and an instruction pointer can be set to the called address. (In one aspect, the instruction pointer can be a register in a processor that can hold an address of a next instruction to be executed). The called function can push a register in a processor used to reference the stack frame, can point that register at that address, can store any registers in the processor being used that the platform application binary interface requires it to preserve, can allocate local variables by subtracting from the stack pointer (RSP), and can execute the function call. When completed, the called function can set the stack pointer to what it was before the variables were allocated via addition, can restore the registers old value of the frame pointer register if stored, can remove the return address from the stack, and can set the instruction pointer.

It should be noted that as used herein, "push" can refer to pushing one or more registers of the processor, by setting the stack pointer to a smaller value (usually by subtracting four times the number of registers to be pushed on the stack) and copying the registers to the stack. Pop can refer to popping one or more registers, by copying the data from the stack to the registers, then to add a value to the stack pointer (usually adding 4 or 8 times the number of registers to be popped on the stack). Thus, pushing can be for saving the contents of the register to memory, and popping can be for restoring the contents of the register from memory.

In one aspect, computing systems can issue an I/O request (e.g., I/O thread). Each I/O thread can have a reserved region of memory referred to as its stack. In one aspect, the stack can be a region of memory where data can be added and/or removed, such as in a last-in-last out, manner, as explained above. In one aspect, one or more 64 bit registers can be used along with addressing modes to address memory operands. These registers can be referenced by the names RSP, RBP, RDI, RSI, and RDX. The RSP register can be stack pointer, the RBP register can be a base pointer, the RDI register can be used to pass a first argument to a function, the RSI register can be used to pass a second argument to functions, and the RDX register can be used to pass a third argument to functions. When a function executes, the I/O thread may add some of its state data to the top of the stack. When the function exits, the I/O thread can be responsible for removing that data from the stack. At a minimum, the I/O thread's stack can be used to store the location of function calls in order to allow return statements to return to the correct location.

Also, the RSP and/or the RBP can be designations of registers on a processor, such as, but not limited to, a processor that uses an x86 instruction set architecture. In one aspects, a different set of registers can be 1) used for the same purpose as other designated registers, 2) can be used to pass function call parameters, and/or 3) implement the various embodiments described herein.

Currently, however, computing storage systems are unable to distinguish between the various types of data and/or classes of I/O requests that can be issued. Thus, the present technology can utilize a state of an application program that can be left or retained in one or more CPU registers and/or left or retained in a memory to trace back to the application program to the exact code (e.g. software code) that caused the I/O request. As such, a method for extraction of a CPU context as described herein can be applicable to one or more computing architectures, such as, for example, Intel Architecture (IA) Extended Memory 64 Technology (EM64T) computing architecture, etc.

Extraction of an I/O Context

FIG. 1 is a block diagram 100 of an input/output (I/O) call context extraction operation. The I/O context of FIG. 1 can be used in an Intel Architecture (IA) Extended Memory 64 Technology (EM64T) computing architecture, but is not limited to that architecture. That is, FIG. 1 depicts a solution for decoding the trace or state of an application program that is left or retained in one or more CPU registers and/or left or retained in a memory to trace back to the application program to the exact code (e.g. software code) that caused the I/O request. In short, the trace of the state can be decoded back to the application program left on CPU registers and/or memory in order to determine the purpose, the meaning, and/or the context of an I/O request being issued.

In one aspect, when an I/O request being issued, a "call instruction" can being used to access library functions. The call instruction can alter an instruction pointer, or relative instruction pointer (RIP) to that of a function being called while pushing increased RIP onto a stack. In one aspect, the RIP can be an instruction pointer on the computing architecture, such as the EM64T. Also, a RIP can be a program counter that can have one or more different designations on various other types of computing architectures. In one aspect, "increased RIP" can refer to the instruction pointer after execution of an instruction that can be incremented by size of the instruction. The size can be increased by one or more bytes. In one aspect, for call instructions, the increased RIP can be increased between four and ten bytes. Thus, the RSP can contain a return address upon function entry (e.g., after C prologue, including pushing the RBP onto the stack, the RSP return address can change). In one aspect, the I/O extraction operation can be generalized to operate using one or more different operating systems. That is, the same set of registers and layout of the stack can be used in one or more different operating systems (OS) and/or different computing architectures.

As depicted in FIG. 1, "tmp" can refer to any temporary CPU register. In one aspect, the RBP can be stored to any temporary (tmp) register, as in block 110. On top of the stack can be the RSP that can contain a return address that can be collected, as in block 120. 8 bites over from the RBP (e.g., Tmp+8) can be the previous stack frame and the address can be collected, as in block 130. The previous function return address can be collected from the base pointer (e.g., the RBP register), as in block 140. As long as the RBP register or previous RBP is not zero ("0"), as in block 140, the process can move up to the main function of the program that is started and associate the I/O context at a particular location of the program, but also with a specified execution flow. If the main function is not reached, a collection of return addresses can be returned, as in block 160 (e.g., a collection of each of the registers addresses can be returned).

Figure 2:
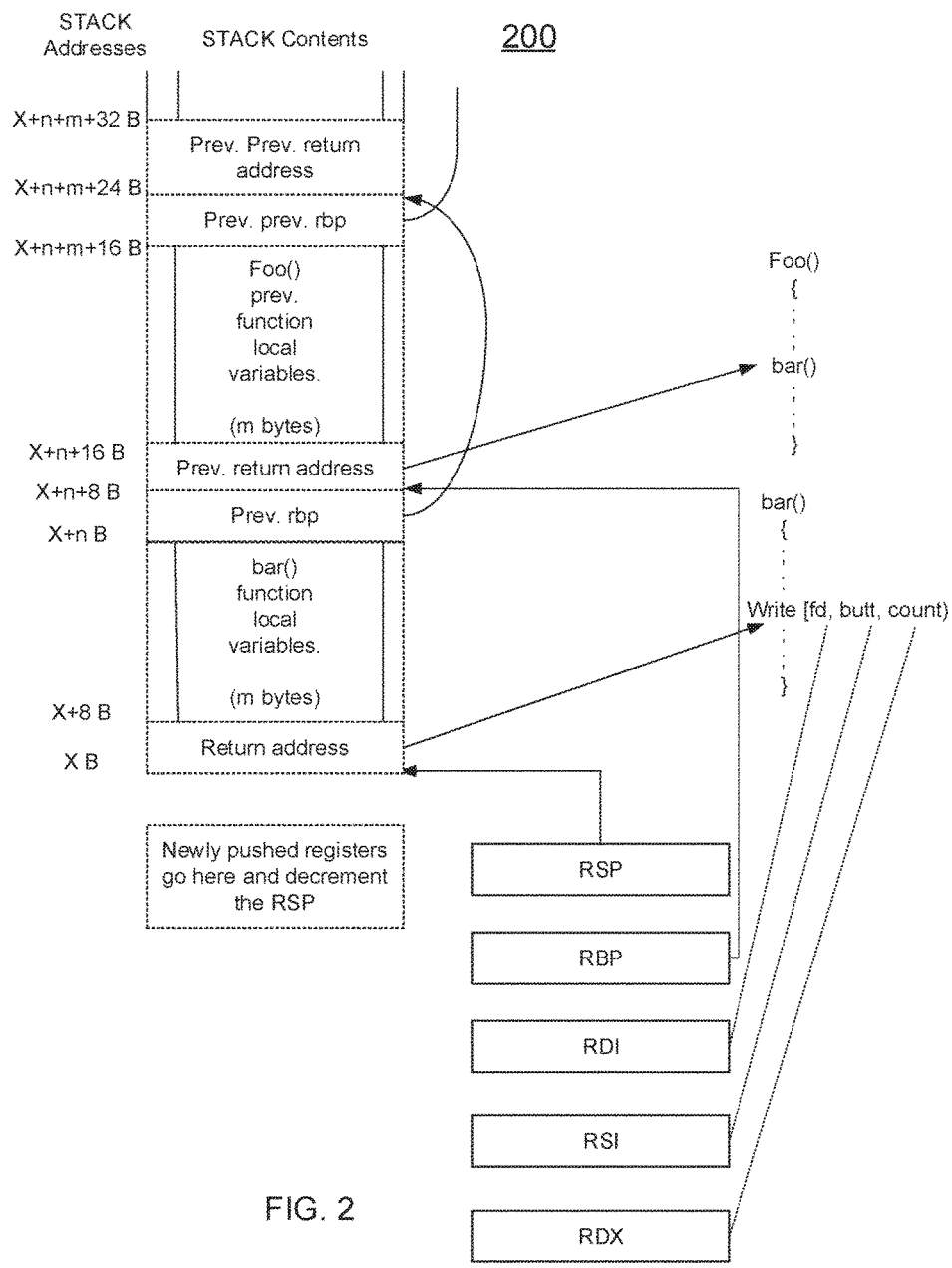
FIG. 2 is a block diagram of contents of a stack frame and register window when an input/output (I/O) request is issued in accordance with an example embodiment.

FIG. 2 is a block diagram 200 of contents of a stack frame and register window when an input/output (I/O) request is issued. More specifically, FIG. 2 depicts a state of memory (e.g., a stack and one or more registers) during an I/O operation call to which an application operation refers. That is, FIG. 2 details a layout of a stack and context of a register frame in the exact moment of an I/O request call. In one aspect, the stack content illustrates both a stack addresses and stack contents of a stack frame and the register window when an input/output (I/O) request is issued. In one aspect, a function call can be the main function and can call a function Foo ( ) which can call a function Bar ( ) which can call a function write ( ).

FIG. 2 depicts registers RSP, RBP, RDI, RSI, and RDX. The RSP register can be the stack pointer, the RBP register can be a base pointer, the RDI register can be used to pass a first argument to a function (e.g., a write function such as "write (fd, buff, count)", the RSI register can be used to pass a second argument to the function, and the RDX register can be used to pass a third argument to the function. The RSP register (e.g., the stack pointer register) can point to a last valid entry on the stack space.

In one aspect, the stack 200 is growing from top to bottom. That is, the stack addresses (illustrated with variables x, n, m, and B (byte) depict the higher address at the top of the stack and the stack addresses descend down the stack to the lower address at the bottom of the stack (e.g., x+n+m+32 B, x+n+m+24 B, x+n+m+16 B, x+n+16 B, x+n+8 B, x+n B, x+8 B, and x B). The return address, the previous return addresses (e.g., prev. return addr. and/or prev. prev. return address), and/or the previous return RBP registers (e.g., prev RBP, prev. and/or prev RBP) are also depicted on the stack. In one aspect, the "return address" can refer to a place/location from which a "write" function can be called. In another aspect, the "prev. return address" can refer to a place/location from which a "bar" function can be called. All newly pushed registers go at the bottom of the stack and the RSP register can be decremented.

I/O Metadata Processing

Figure 3:
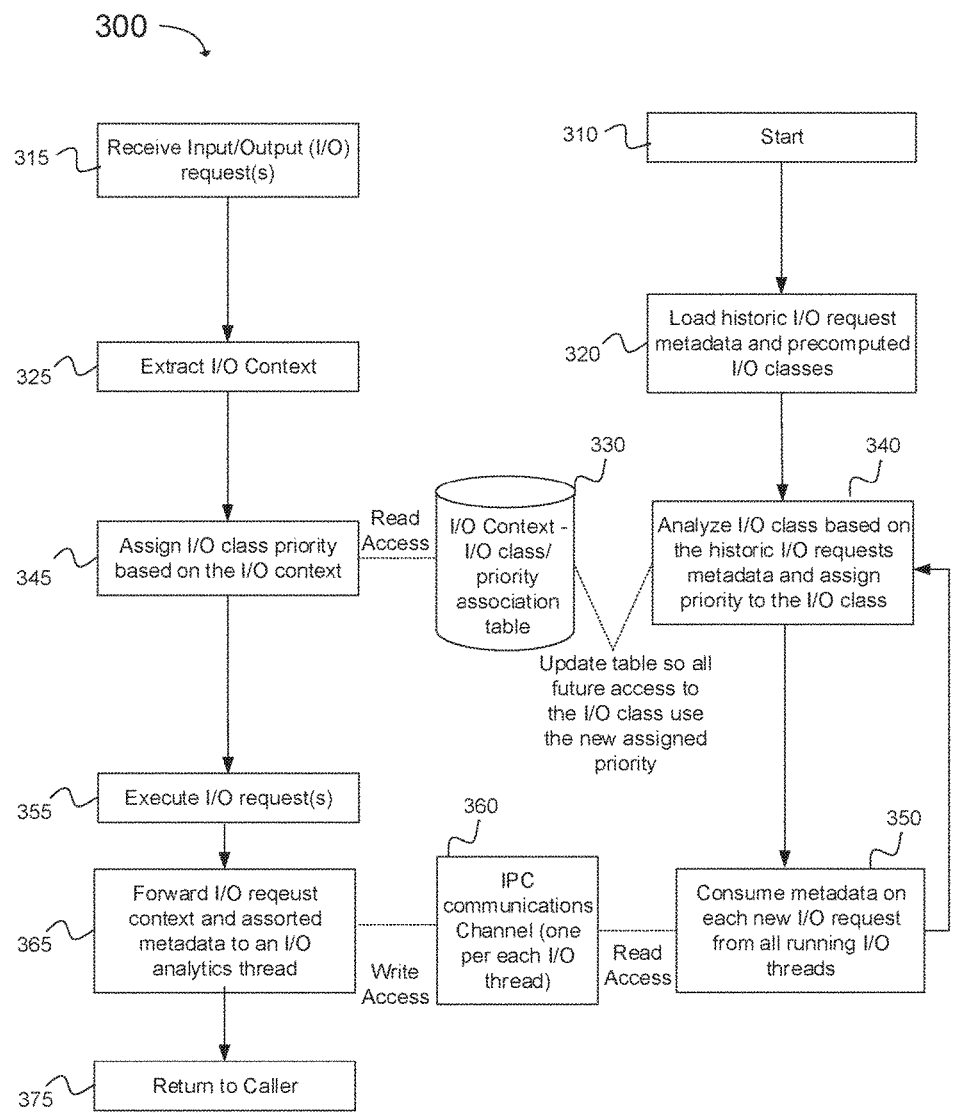
FIG. 3 depicts a flowchart for cooperation between and I/O context thread and an offline I/O classification operation in accordance with an example embodiment.

Currently, there is no practice of determining an I/O class, such as, for example, how likely is a given I/O request to be sequential, (e.g. how likely is the given I/O request pertaining to a block that will subsequently be read). In one aspect, an I/O classification operation can be performed by cooperating with an I/O context extraction operation for context I/O classification. In other words, FIG. 3 depicts a "machine self-learning" mechanism where one or more past or "previous" I/O operation processes can be used to generate one or more policies or rules that accelerate future or subsequent I/O request operation processing. Turning now to FIG. 3, a flowchart 300 is depicted for cooperation between an I/O context thread and an offline I/O classification operation. That is, FIG. 3 describes how these two operations cooperate with each other (e.g., the I/O classification operation cooperating with the I/O context extraction operation). It should be noted that the I/O classification operation cooperating with the I/O context extraction operation can be implemented with asynchronous I/O processing.

In one aspect, the I/O classification operation can cooperate with the I/O context extraction operation by using an offline I/O analytics thread that can be implemented as a process or thread (e.g., either using kernel mode or user mode) independent from all other I/O intensive workloads. In one aspect, the offline I/O analytics thread process can set up and/or use one or more shared memory data structures. In one aspect, the term "offline" can refer to offline, batch I/O processing and the results of the offline, batch I/O processing are not constrained to be delivered immediately (i.e. the offline/batch I/O processing can be performed during a low system load and/or performed on separate or dedicated system). Additionally, "offline" can refer to waiting for offline, batch I/O processing and the additional time does not affect processing speed degradation because processing of a specific I/O request does not have to wait to be processed by an I/O analytics thread.

As illustrated in FIG. 3, the one or more shared memory data structures can include table 330 and an inter process communications channel (IPC) implementing queue 360. The table 330 (e.g., I/O context and I/O class/priority association table) can be used to associate I/O contexts and I/O classes/priorities. In one aspect, table 330 can be a hash table and/or a plain table. In one aspect, the shared memory data structures can provide one or more qualities, such as, for example, fast and/or random access for reading.

In one aspect, the table 330 can act as a key-value store where the key can be the I/O context and value can be the I/O class. In one aspect, IPC channel-implementing queue 360 (also referred to herein as an "IPC communications channel") can be a named pipe, a domain socket, a circular buffer in shared memory, and/or any other data structure providing one or more specified or defined qualities. In one aspect, the IPC channel implementing queue 360 can be used to transfer metadata about each of the processed I/O requests from an I/O processing thread to an I/O analytics thread. It should be noted that the table 330 and/or the IPC communications channel 360 can be lockless and/or duplicated for each I/O processing thread in order to avoid single bottlenecks among I/O processing thread.

In operation, method 300 for executing the I/O classification operation with the I/O context extraction operation can include first receiving one or more I/O requests, as in block 315. The I/O context can be extracted from the one or more I/O requests, as in block 325. The I/O class (e.g., I/O request class type) can be assigned, using table 330, a priority level (e.g., a ranking or determined level of priority for executing an I/O request as compared to other I/O requests), as in block 345. For example, the I/O request can be one of a variety of types of classes. In one aspect, for a database application, an I/O request may be classified according to I/O operations pertaining to a transaction log, a temporary table, a system table, a free space map, a random/sequential user table, and/or an index file. In an additional aspect, for a graphics application, one or more I/O request class types may be classified according to texture, a map, and/or a mesh, keyframe. In an additional aspect, for general computing systems, one or more I/O requests may be classified according to an application I/O, a large file I/O, a small file I/O, a filesystem superblock, and/or a directory. In short, a "request class" or "type" can refer to a purpose for which data is being accessed, context within which it is accessed and/or a type of data that is being accessed, such as for example, a type of file (i.e. graphics or text).

The I/O requests can be executed, as in block 355. The I/O context and metadata of the one or more I/O requests can be forwarded to an I/O analytics thread, using the IPC communications channel 360, as in block 365. The I/O request can be executed and returned to the caller of the I/O request, as in block 375.

In one aspect, the method 300 designed for executing the I/O classification operation with the I/O context extraction operation can include a start operation, as in block 310. Historic I/O request metadata and precomputed I/O classes can be loaded, as in block 320. In one aspect, I/O class (e.g., I/O class type) can be analyzed based on metadata of the historic I/O requests. Also, a caching and/or performance priority can be assigned to each of the various I/O class types. The table 330 can be updated so that all future access to the I/O class can use a newly assigned or updated caching and/or performance priority for the one or more I/O classes. The metadata on each new I/O request executing from all running I/O threads can be consumed, as in block 350. In other words, metadata can be read and/or analyzed, such as by being fed into a neural network and/or processed using, for example, one or more types of heuristics.

In one aspect, in operation, the offline I/O analytics thread can read all metadata on I/O threads that are processed, analyze the read metadata of the processed I/O threads, and/or update the I/O contexts in table 330. It should be noted that executing the offline I/O analytics thread can be a slow process, as compared to executing the actual I/O thread, such as, for example, the offline I/O analytics thread can update the table 330 once a minute, once an hour, once a day, and/or update the table at selected time periods.

In one aspect, for actual I/O thread processing (e.g., "actual I/O processing thread" of FIG. 3), when an I/O request is received, an I/O context extraction routine can be called as per one or more embodiments, actions, and/or descriptions illustrated in FIGS. 1 and 2. Table 330 can associate I/O contexts with each I/O request. The table can also be accessed (for reading) to extract an actual preferred I/O priority and/or I/O processing policy as decided by the I/O analysis thread. The actual I/O request can be processed accordingly. In one aspect, after processing an I/O request, the I/O request can be passed for further analysis.

In one aspect, data can be passed about each I/O request, such as call contexts, call parameters, calling thread parameters, and/or metadata on one or more computer systems. In one aspect, the call context can include either a set of addresses and/or a hash values created from the addresses. In one aspect, the call parameters can be, for example, file descriptors, request offset, request length, and/or a buffer. In one aspect, data can be passed about one or more I/O request calls. Also, the call parameters can include one or more calling thread parameters, such as, for example, runtime, process identification (ID), and/or thread ID). In one aspect, metadata on executables for an I/O request can include, for example, a name, version, and/or checksum of an image, etc.).

In some embodiments, when an I/O analytics thread is already trained and an associative table is filled with data, it is possible to use a caching application to determine that if a read is issued from certain function context 'Foo', it is likely to be a sequential read (e.g., greater than a defined threshold or greater than 50 percent). For example, if the read operation is a sequential read there may be no constraint to cache the sequential read since disk arrays are fast enough for sequential access to process the sequential read and caching the sequential read may pollute the cache. However, if the read is for random access there may be a constraint to cache the random access read.

Figure 4:
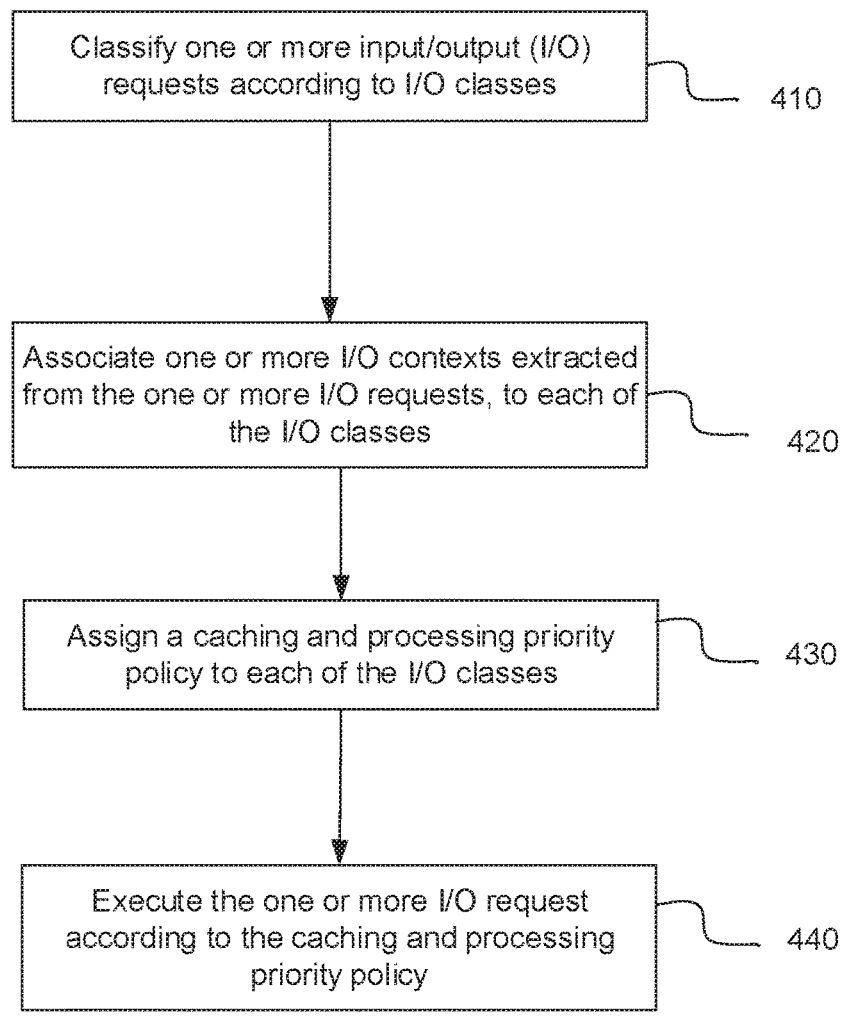
FIG. 4 depicts a flowchart of a method for performing input/output (I/O) request execution in accordance with an I/O class priority in accordance with an example embodiment.

FIG. 4 depicts a flowchart of a method 400 for performing input/output (I/O) request execution in accordance with an I/O class. The method 400 can be executed as instructions on a machine, where the instructions are included on at least one computer readable medium or one non-transitory machine-readable storage medium. The method 400 can include the operation of: classifying one or more input/output (I/O) requests according to I/O classes, as in block 410. The method can include the operation of: associating one or more I/O contexts extracted from the one or more I/O requests, to each of the I/O classes, as in block 420. In one aspect, the I/O class can be determined in an I/O analytics thread. Also, data and/or I/O requests can be assigned to the various types of I/O classes, as described, for example, in FIG. 1. The method can include the operation of: assigning a caching and processing priority policy to each of the I/O classes, as in block 430. The method can include the operation of: executing the one or more I/O request according to the caching and processing priority policy, as in block 440.

Figure 5:
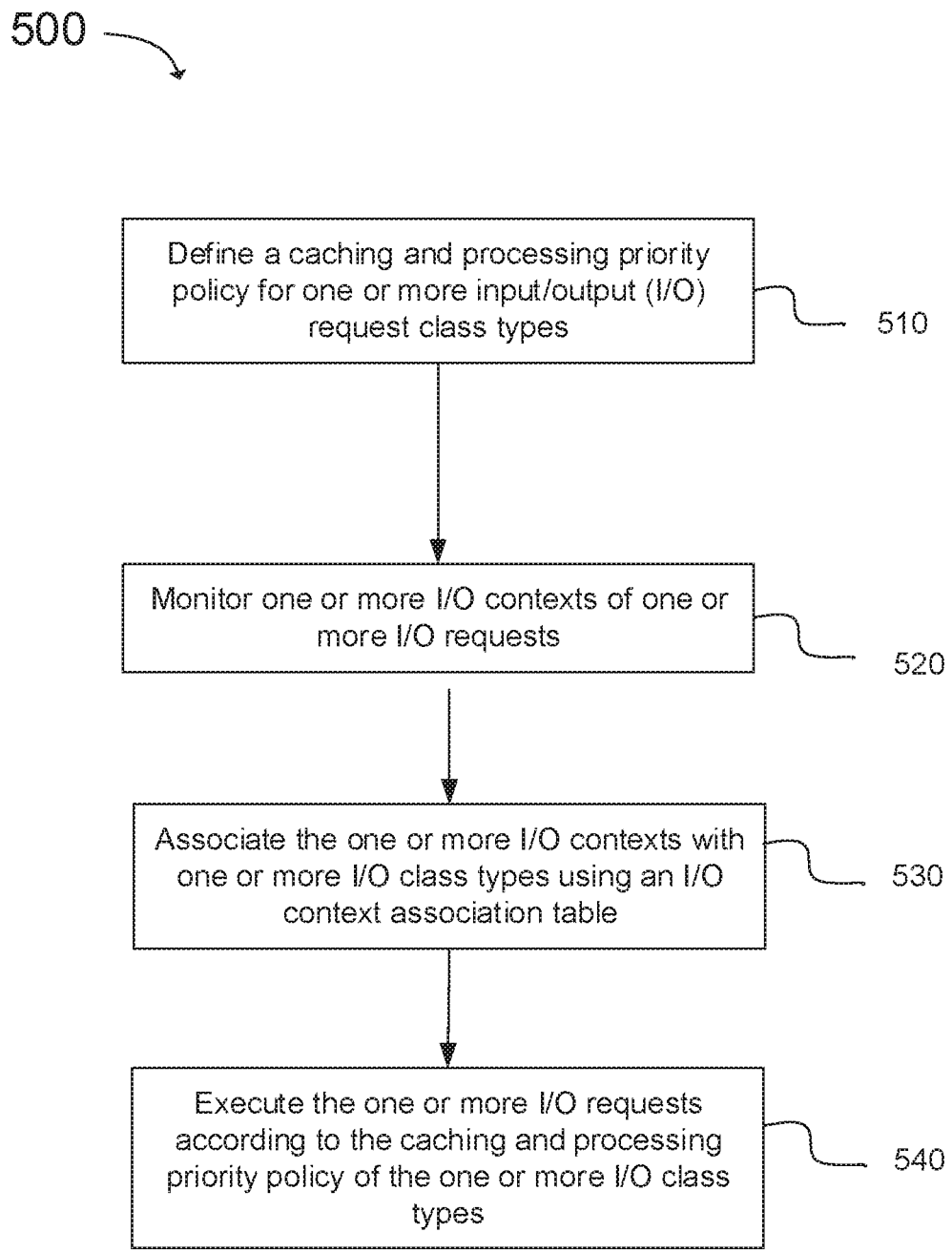
FIG. 5 depicts a flowchart of a method for performing input/output (I/O) request execution in accordance with context I/O classification in accordance with an example embodiment.

FIG. 5 depicts a flowchart of an additional method 500 for performing input/output (I/O) request execution in accordance with context I/O classification. The method 500 can be executed as instructions on a machine, where the instructions are included on at least one computer readable medium or one non-transitory machine-readable storage medium. The method can include the operation of: defining a caching and processing priority policy for one or more input/output (I/O) request class types, as in block 510. The method can include the operation of: monitoring one or more I/O contexts of one or more I/O requests, as in block 520. The method can include the operation of: associating the one or more I/O contexts with one or more I/O class types using an I/O context association table, as in block 530. The method can include the operation of: executing the one or more I/O requests according to the caching and processing priority policy of the one or more I/O class types, as in block 540.

Figure 6:
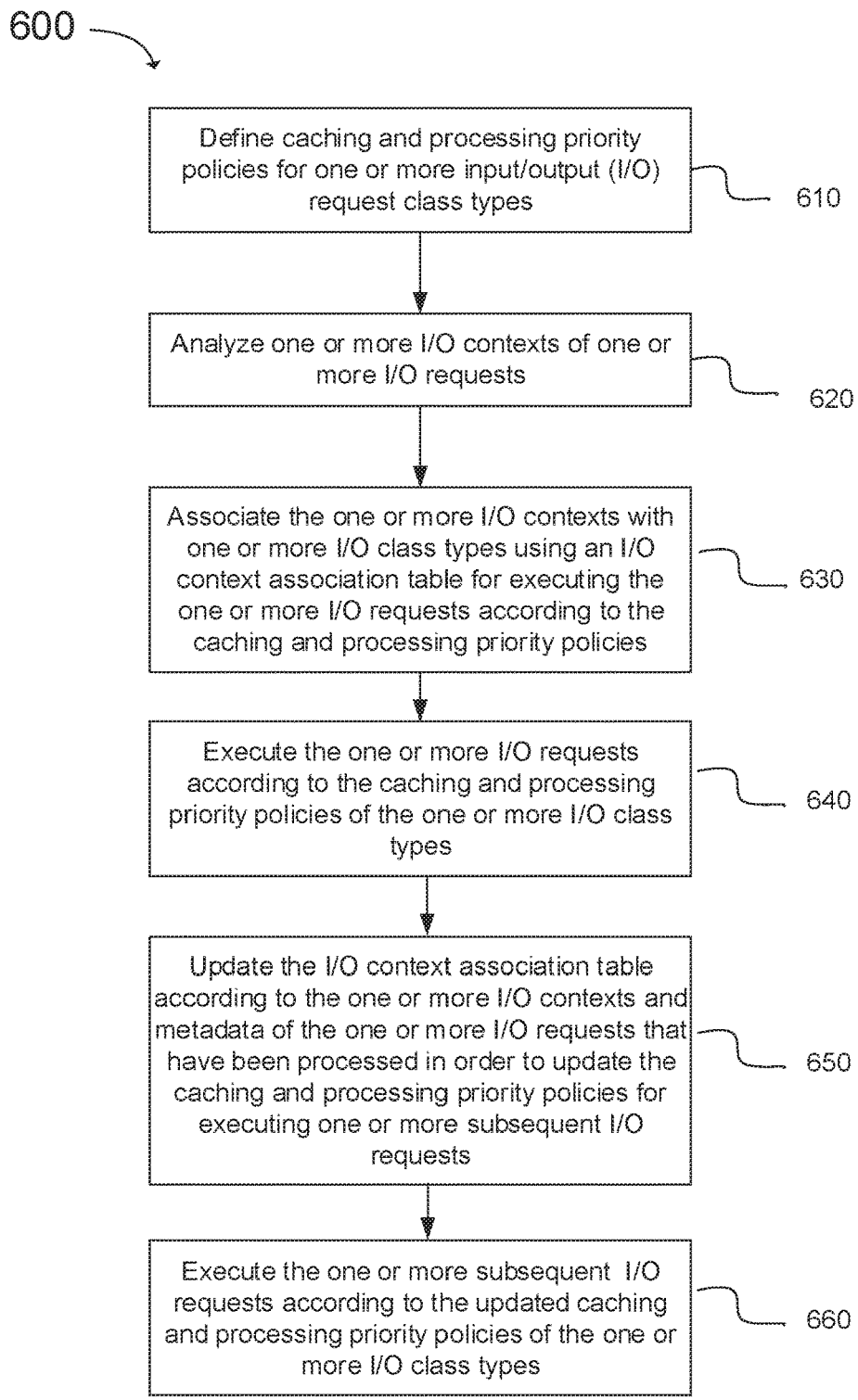
FIG. 6 depicts a flowchart of an additional method for performing input/output (I/O) request execution in accordance with context I/O classification in accordance with an example embodiment.

FIG. 6 depicts a flowchart of an additional method 600 for performing input/output (I/O) request execution in accordance with a context I/O classification. For example, block 440 (FIG. 4) can include method 600. The method 600 can be executed as instructions on a machine, where the instructions are included on at least one computer readable medium or one non-transitory machine-readable storage medium. The method can include the operation of: defining caching and processing priority policies for one or more input/output (I/O) request class types, as in block 610. The method can include the operation of: analyzing one or more I/O contexts of one or more I/O requests, as in block 620. The method can include the operation of: associating the one or more I/O contexts with one or more I/O class types using an I/O context association table for executing the one or more I/O requests according to the caching and processing priority policies, as in block 630. The method can include the operation of: executing the one or more I/O requests according to the caching and processing priority policies of the one or more I/O class types, as in block 640. The method can include the operation of: updating the I/O context association table according to the one or more I/O contexts and metadata of the one or more I/O requests that have been processed in order to update the caching and processing priority policies for executing one or more subsequent I/O requests, as in block 650. The method can include the operation of: executing the one or more subsequent I/O requests according to the updated caching and processing priority policies of the one or more I/O class types, as in block 660. In one aspect, I/O requests can execute in parallel. For example, two or more I/O requests belonging to a same I/O class type can be executed in parallel. Also, two or more I/O requests belonging to different I/O class types can be executed in parallel.

In one aspect, caching a storage system main application using a context based I/O classification operation, prior to inserting the data of the application into a cache, cold and hot data can be differentiated. This can be done via extending a caching engine with I/O class interpretation mechanism.

Application for Caching

In one aspect, for caching storage system main applications, a context based I/O classification mechanism can be used for differentiating cold and hot data before data is even inserted into cache. This can be done via extending a caching engine with I/O class interpretation mechanism, such as by using the various embodiments described in FIG. 3. In one aspect, hot data can be data that is accessed frequently and cold data can be data that is accessed lest frequently, particularly as compared to the hot data.

Figure 7:
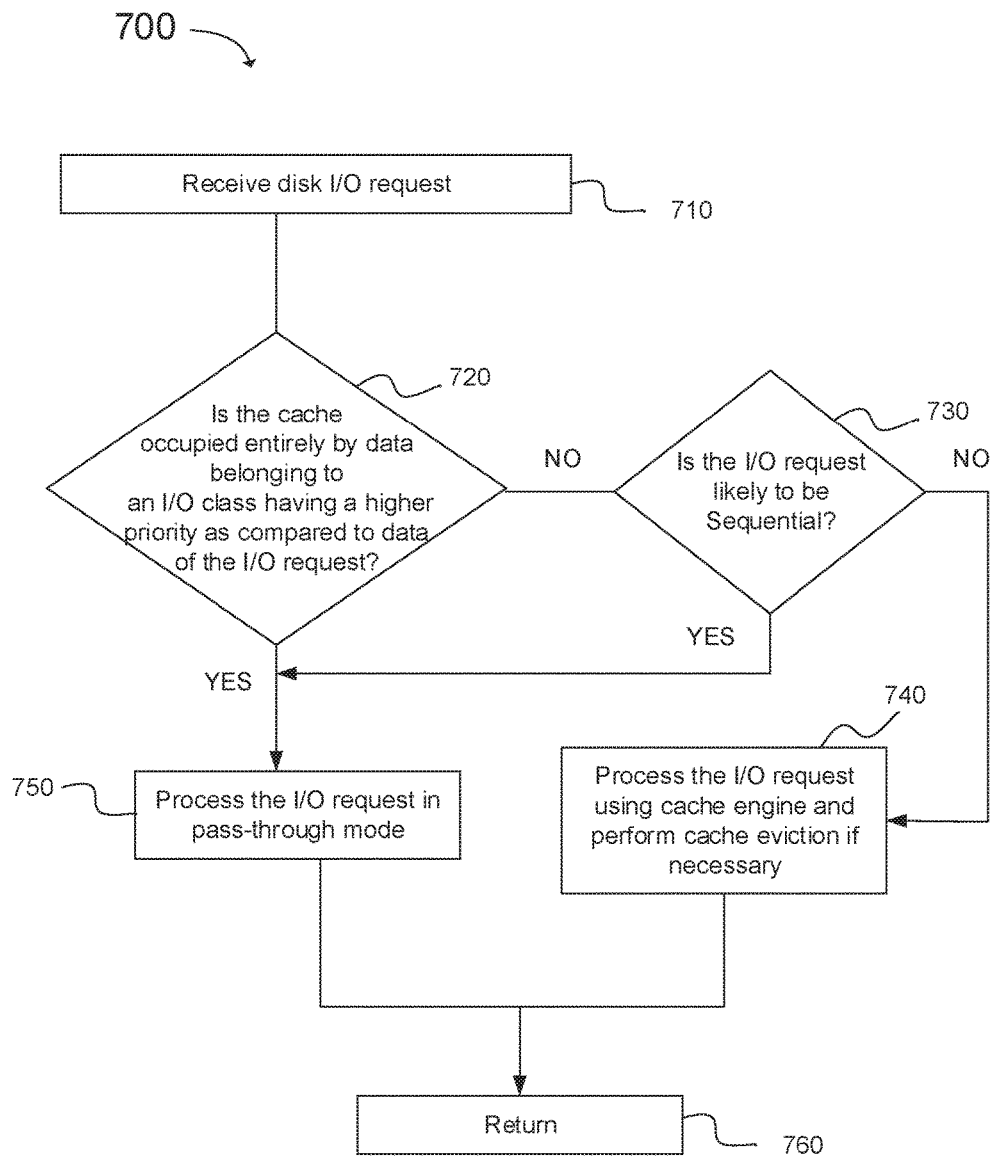
FIG. 7 depicts a flowchart of an additional method for caching an application according to I/O classification in accordance with an example embodiment.

Turning now to FIG. 7, there is illustrated a process that includes executing an I/O request according to an assigned I/O class, as described in FIG. 3. More specifically, FIG. 7 depicts a flowchart of an additional method 700 for a caching mechanism for context based I/O classification. The method 700 can be executed as instructions on a machine, where the instructions are included on at least one computer readable medium or one non-transitory machine-readable storage medium. The method can include the operation of: receiving an incoming I/O request, as in block 710. The method can include the operation of: determining if a cache is entirely occupied by data belonging to and/or associated with higher priority I/O classes (as compared to data of the incoming I/O requests), as in block 720. If yes at block 720, the method can move to block 750. The method can include the operation of: processing the I/O request in a pass-through mode, as in block 750. If no at block 720, the method can move to block 730. In one aspect, the pass-through mode can be when a caching program retrieves data from a primary storage while skipping a cache operation because the benefit from caching for selected data is considered to be relatively small and/or inconsequential. In one aspect, a pass through mode can be where caching is not used for a selected piece of data. The method can include the operation of: determining if the I/O request is likely to be sequential data (e.g., greater than a selected threshold), as in block 730. If no at block 730, the method can move to block 740. If yes, at block 730, the method can move to block 750. The method can include the operation of: process the I/O request using a cache engine and perform a cache eviction operation if necessary, as in block 740.

Application for Storage Tiering

In one aspect, the present technology of context based I/O classification, as describe herein, may be applied to tiering storage systems. In one aspect, for tiering storage systems, a main application for the context based I/O classification mechanism is differentiating between cold and hot data before data is written onto a tiered storage pool, thus limiting an amount of block reclassification. To achieve this objective, it is important to build the tiered storage solution around the context based I/O classification mechanism as described herein. Additionally, associating I/O classes (hashed contexts of I/Os) with stored data can allow accurate data reclassification. It should be noted that on the kernel mode block device driver, when used in kernel mode (e.g., kernel node caching, kernel node tiering driver, and file system metadata writes) superblock, inode data, and regular file data writes can be classified accordingly.

Implementation Methods

In one aspect, a method or system for context based I/O classification can replace standard library write, read, and/or seek functions (e.g., wrappers around system calls) for functions implementing I/O processing. In one aspect, a method or system for context based I/O classification, as described herein, can replace a "syscall" handling code in an operating kernel. In one aspect, a method or system for context based I/O classification, as described herein, can implement a loadable kernel module that can access the I/O context information from an upper portion of a kernel and userspace stack. In one aspect, a method or system for context based I/O classification, as described herein, can implement a hardware assisted method of altering CPU microcode via financing so that a "syscall instruction" can call interposing code that will execute the algorithm.

In one aspect, method or system for context based I/O classification, as described herein, can be used with a loadable kernel module. The loadable kernel module (LKM) can be an object file that contains code to extend a running kernel "base kernel" of an operating system. LKMs can be used to add support for new hardware and/or file systems for adding system calls. In one aspect, in implementing a loadable kernel module that can access information from upper portion of a kernel and userspace stack, an operating system (OS) kernel can be patched. It should be noted that hierarchical protection domains (e.g., "protection rings") can be used to protect data and functionality from faults and/or malicious behavior. In one aspect, rings can be arranged in hierarchy from a most privileged (most trusted which may be numbered as zero) to least privileged (least trusted, usually with a highest ring number). In one aspect, ring 0 can be a level with the most privileges and can interacts most directly with the physical hardware such as the CPU and memory. For example, four rings (numbered 0 to 3) of privilege levels can be used to protect system code and data from being unintentionally or maliciously over-written by lower privileged code. Ring 0 can be the highest privilege level, while ring 3 can be the lowest. OSs may use different privilege levels for different processes. In one aspect, when the OS kernel is transitioning between ring 3 and ring 0, the OS can save one or more register states from a userspace program (so that it can be restored upon sysret). In this state, the state of userspace program can be extracted before entering lower layers of OS kernel. In an alternative embodiment, the state of userspace context can be extracted in block mode driver. In one aspect, a loadable kernel module can access the I/O context information by altering a standard C library.

Figure 8:
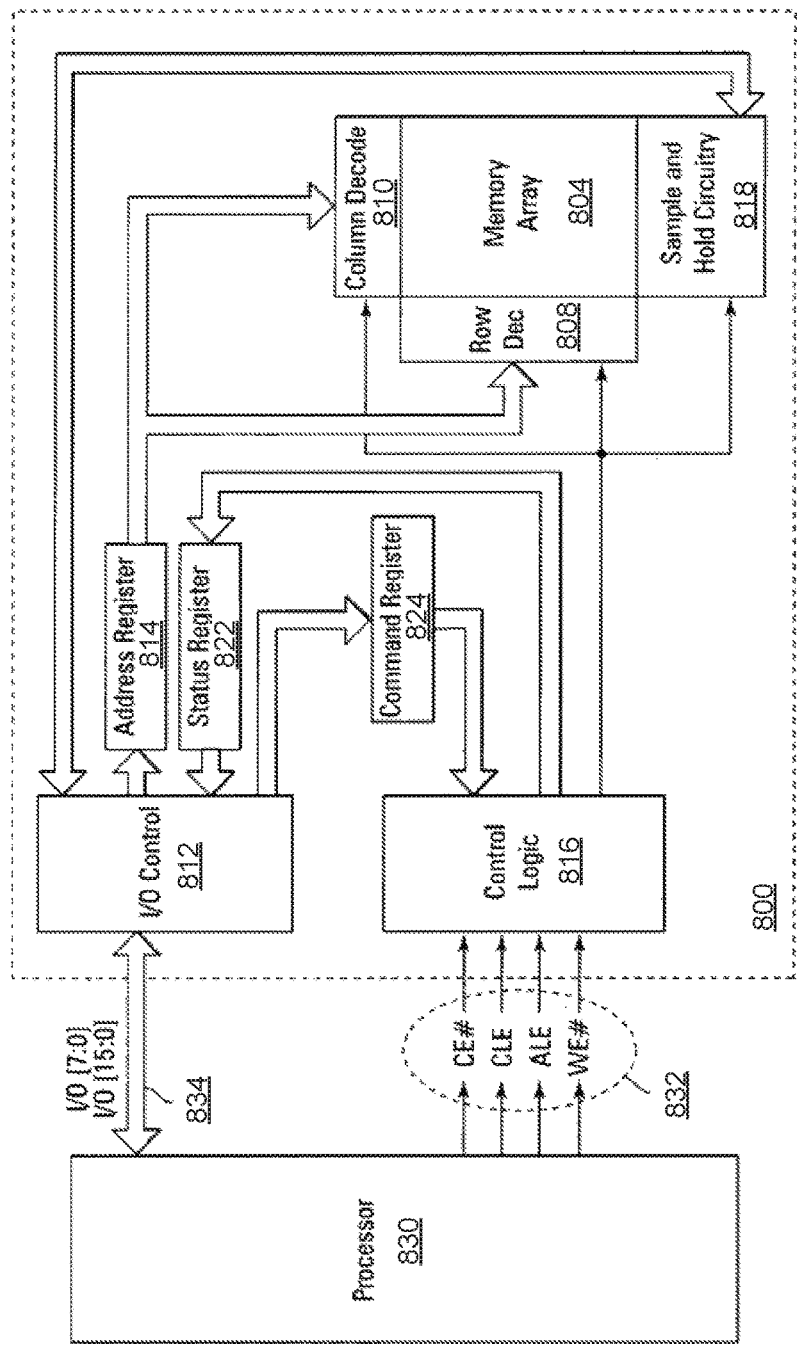
FIG. 8 illustrates a memory system diagram in accordance with an example embodiment.

FIG. 8 is a simplified block diagram of a memory device 800 according to an embodiment, and on which various methods can be practiced. Memory device 800 includes an array of memory cells 804 arranged in rows and columns. Although the various embodiments will be described primarily with the illustrated memory array, the various embodiments are not limited to a specific architecture of the memory array 804. In general, the embodiments described herein are adaptable to any array architecture permitting generation of a data signal indicative of state of a memory cell, such as through a the threshold voltage.

A row decode circuitry 808 and a column decode circuitry 810 are provided to decode address signals provided to the memory device 800. Address signals are received and decoded to access memory array 804. Memory device 800 also includes input/output (I/O) control circuitry 812 to manage input of commands, addresses and data to the memory device 800 as well as output of data and status information from the memory device 800. An address register 814 is coupled between I/O control circuitry 812 and row decode circuitry 808 and column decode circuitry 810 to latch the address signals prior to decoding. A command register 824 is coupled between I/O control circuitry 812 and control logic 816 to latch incoming commands. Control logic 816 controls access to the memory array 804 in response to the commands and generates status information for an external processor 830 (also known as a memory controller as described earlier). The control logic 816 is coupled to row decode circuitry 808 and column decode circuitry 810 to control the row decode circuitry 808 and column decode circuitry 810 in response to the addresses.

Control logic 816 can be coupled to a sample and hold circuitry 818. The sample and hold circuitry 818 latches data, either incoming or outgoing, in the form of analog data signals. For example, the sample and hold circuitry could contain capacitors or other analog storage devices for sampling either an incoming data signal representing data to be written to a memory cell or an outgoing data signal indicative of the threshold voltage sensed from a memory cell. The sample and hold circuitry 818 can further provide for amplification and/or buffering of the sampled signal to provide a stronger data signal to an external device.

The handling of analog data signals can take an approach where charge levels generated are stored on capacitors. A charge can be stored on a capacitor in response to subjecting it to a data signal indicative of an actual or target threshold voltage of a memory cell for reading or programming, respectively, the memory cell. This charge could then be converted to an analog data signal using a differential amplifier having a grounded input or other reference signal as a second input. The output of the differential amplifier could then be passed to the I/O control circuitry 812 for output from the memory device, in the case of a read operation, or used for comparison during one or more verify operations in programming the memory device. It is noted that the I/O control circuitry 812 could optionally include analog-to-digital conversion functionality and digital-to-analog conversion (DAC) functionality to convert read data from an analog data signal to a digital bit pattern and to convert write data from a digital bit pattern to an analog signal, such that the memory device or apparatus 800 could be adapted for communication with either an analog or digital data interface.

During a programming operation, target memory cells of the memory array 804 are programmed until voltages indicative of their Vt levels match the levels held in the sample and hold circuitry 818. This can be accomplished, as one example, using differential sensing devices to compare the held voltage level to a threshold voltage of the target memory cell. Much like traditional memory programming, programming pulses could be applied to a target memory cell to increase its threshold voltage until reaching or exceeding the desired value. In a read operation, the Vt levels of the target memory cells are passed to the sample and hold circuitry 818 for transfer to an external processor (not shown in FIG. 8) either directly as analog signals or as digitized representations of the analog signals depending upon whether ADC/DAC functionality is provided external to, or within, the memory device.

Threshold voltages of cells can be determined in a variety of manners. For example, an access line, such as those typically referred to as word lines, voltage could be sampled at the point when the target memory cell becomes activated. Alternatively, a boosted voltage could be applied to a first source/drain side of a target memory cell, and the threshold voltage could be taken as a difference between its control gate voltage and the voltage at its other source/drain side. By coupling the voltage to a capacitor, charge would be shared with the capacitor to store the sampled voltage. Note that the sampled voltage need not be equal to the threshold voltage, but merely indicative of that voltage. For example, in the case of applying a boosted voltage to a first source/drain side of the memory cell and a known voltage to its control gate, the voltage developed at the second source/drain side of the memory cell could be taken as the data signal as the developed voltage is indicative of the threshold voltage of the memory cell.

Sample and hold circuitry 818 can include caching, i.e., multiple storage locations for each data value, such that the memory device 800 can be reading a next data value while passing a first data value to the external processor, or receiving a next data value while writing a first data value to the memory array 804. A status register 822 is coupled between I/O control circuitry 812 and control logic 816 to latch the status information for output to the external processor.

Memory device or apparatus 800 receives control signals at control logic 816 over a control link 832. The control signals can include a chip enable CE#, a command latch enable CLE, an address latch enable ALE, and a write enable WE#. Memory device 800 can receive commands (in the form of command signals), addresses (in the form of address signals), and data (in the form of data signals) from an external processor over a multiplexed input/output (I/O) bus 834 and output data to the external processor over I/O bus 834.

In a specific example, commands are received over input/output (I/O) pins [8:0] of I/O bus 834 at I/O control circuitry 812 and are written into command register 824. The addresses are received over input/output (I/O) pins [7:0] of bus 834 at I/O control circuitry 812 and are written into address register 814. The data can be received over input/output (I/O) pins [7:0] for a device capable of receiving eight parallel signals, or input/output (I/O) pins [15:0] for a device capable of receiving sixteen parallel signals, at I/O control circuitry 812 and are transferred to sample and hold circuitry 818. Data also can be output over input/output (I/O) pins [7:0] for a device capable of transmitting eight parallel signals or input/output (I/O) pins [15:0] for a device capable of transmitting sixteen parallel signals. It will be appreciated by those skilled in the art that additional circuitry and signals can be provided, and that the memory device of FIG. 8 has been simplified to help focus on the embodiments of the disclosure.

While FIG. 8 has been described with respect to sample and hold circuitry 818, it should be understood that the control logic 816 could be coupled to data latches instead of sample and hold circuitry 818 without departing from the scope of the disclosure. During a write operation, target memory cells of the memory array 804 are programmed, for example using two sets of programming pulses as described above, until voltages indicative of their Vt levels match the data held in the data latches. This can be accomplished, as one example, using differential sensing devices to compare the held data to a threshold voltage of the target memory cell.

Additionally, while the memory device of FIG. 8 has been described in accordance with popular conventions for receipt and output of the various signals, it is noted that the various embodiments are not limited by the specific signals and I/O configurations described. For example, command and address signals could be received at inputs separate from those receiving the data signals, or data signals could be transmitted serially over a single I/O line of I/O bus 834. Because the data signals represent bit patterns instead of individual bits, serial communication of an 8-bit data signal could be as efficient as parallel communication of eight signals representing individual bits.

Figure 9:
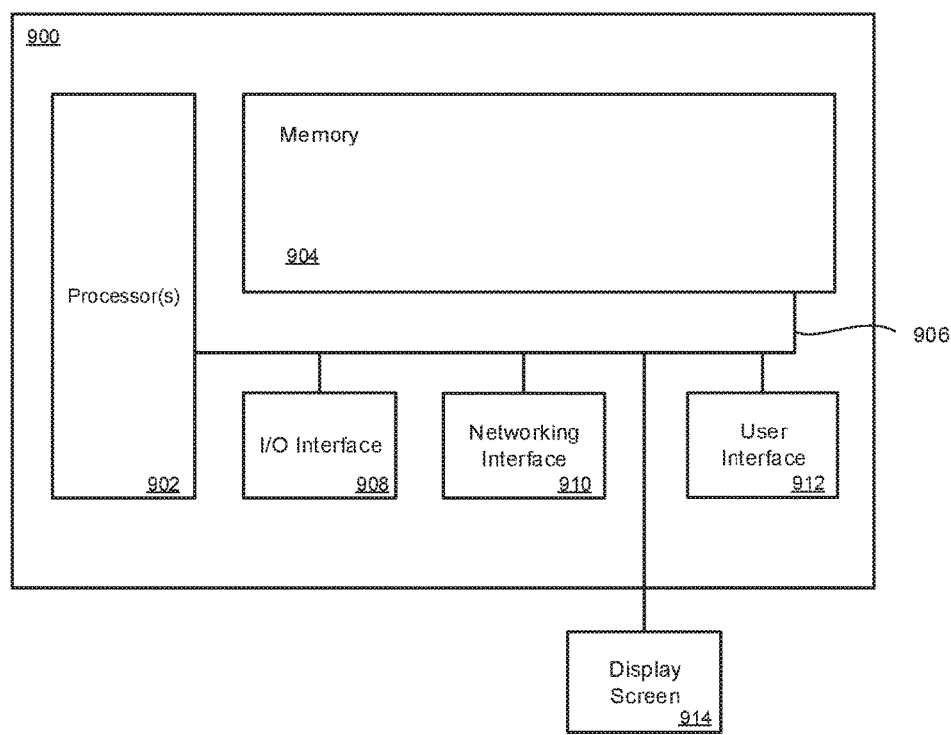
FIG. 9 illustrates a computing system that includes a data storage device in accordance with an example embodiment.

FIG. 9 illustrates a general computing system or device 900 that can be employed in the various embodiments. The computing system 900 can include a processor 902 in communication with a memory 904. The memory 904 can include any device, combination of devices, circuitry, and the like that is capable of storing, accessing, organizing and/or retrieving data. Non-limiting examples include SANs (Storage Area Network), cloud storage networks, volatile or non-volatile RAM, phase change memory, optical media, hard-drive type media, and the like, including combinations thereof.

The computing system or device 900 additionally includes a local communication interface 906 for connectivity between the various components of the system. For example, the local communication interface 906 can be a local data bus and/or any related address or control busses as may be desired.

The computing system or device 900 can also include an I/O (input/output) interface 908 for controlling the I/O functions of the system, as well as for I/O connectivity to devices outside of the computing system 900. A network interface 910 can also be included for network connectivity. The network interface 910 can control network communications both within the system and outside of the system. The network interface can include a wired interface, a wireless interface, a Bluetooth interface, optical interface, and the like, including appropriate combinations thereof. Furthermore, the computing system 900 can additionally include a user interface 912, a display device 914, as well as various other components that would be beneficial for such a system.

The processor 902 can be a single or multiple processors, and the memory 904 can be a single or multiple memories. The local communication interface 906 can be used as a pathway to facilitate communication between any of a single processor, multiple processors, a single memory, multiple memories, the various interfaces, and the like, in any useful combination.

The present embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). When a program code is loaded into and executed by a machine, such as a computer, the machine becomes an apparatus for practicing the various techniques.

Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. Any node and wireless devices can also include a transceiver module, a counter module, a processing module, and/or a clock module or timer module.

One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

Although not depicted, system 900 can use a battery or other power source, such as renewable energy (solar panels), or include circuitry for access to a wall socket or charging port (wired or wireless).

EXAMPLES

The following examples pertain to specific invention embodiments and point out specific features, elements, or steps that can be used or otherwise combined in achieving such embodiments.

In one example there is provided an apparatus comprising:
    a memory controller with circuitry configured to:
        classify one or more input/output (I/O) requests according to I/O classes;
        associate one or more I/O contexts extracted from the one or more I/O requests, to each of the I/O classes;
        assign a caching and processing priority policy to each of the I/O classes;
        execute the one or more I/O request according to the caching and processing priority policy; and
    an interface to the memory controller.

In one example of an apparatus, wherein the memory controller is configured to extract the one or more I/O contexts from the one or more I/O requests.

In one example of an apparatus, wherein the memory controller is configured to use an I/O context association table to associate the one or more I/O contexts to each of the I/O classes in order to update the caching and processing priority policy for one or more subsequent I/O requests.

In one example of an apparatus, wherein the memory controller comprises logic further configured to use an offline I/O analytics process, independent from the one or more I/O requests, using shared memory data structures, wherein the shared memory data structures include at least the I/O context association table and an inter process communications channel.

In one example of an apparatus, wherein the memory controller comprises logic further configured to transfer the one or more I/O contexts and metadata of the one or more I/O requests that have been processed to the I/O analytics thread.

In one example of an apparatus, wherein the memory controller comprises logic further configured to:
    read the one or more I/O contexts and metadata of the one or more I/O requests;
    analyze the one or more I/O contexts and metadata; and
    update the I/O context table that associates the one or more I/O contexts to each of the I/O classes; and update the caching and processing priority policy according to the updated I/O context table for one or more subsequent I/O requests.

In one example of an apparatus, wherein the memory controller is configured to classify the one or more I/O requests into the I/O classes based on at least one of data accesses patterns, data types, data storage types associated with the one or more I/O requests, I/O context call instructions, I/O context call parameters, metadata, and one or more read or write operation types.

In one example of an apparatus, further comprises a memory, the memory is a scratchpad memory, an on-chip memory, or an off-chip memory, byte addressable memory, memory devices that use chalcogenide phase change material, multi-threshold level NAND flash memory, NOR flash memory, single or multi-level PCM, a resistive memory, nanowire memory, ferroelectric transistor random access memory (FeTRAM), magnetoresistive random access memory (MRAM) memory that incorporates memristor technology, or spin transfer torque (STT)-MRAM.

In one example of an apparatus, the apparatus further comprises one or more of:

the NVM, the NVM communicatively coupled to the memory controller;

a processor communicatively coupled to the memory controller;

a network interface communicatively coupled to a processor;

a display communicatively coupled to a processor; or a battery coupled to a processor.

In one example there is provided, a data storage system, the data storage system comprising:

a memory controller comprising logic to:

define a caching and processing priority policy for one or more input/output (I/O) request class types;

monitor one or more I/O contexts of one or more I/O requests;

associate the one or more I/O contexts with one or more I/O class types using an I/O context association table;

execute the one or more I/O requests according to the caching and processing priority policy of the one or more I/O class types; and an interface to the memory controller.

In one example of a data storage system, the memory controller is configured to execute an I/O context extraction call operation to extract the I/O context from the one or more I/O requests upon receiving the one or more I/O requests.

In one example of a data storage system, the memory controller comprises logic further configured to analyze a I/O call context, one or more I/O call parameters, I/O calling thread parameters and metadata of the one or more I/O requests in order to assign the caching and processing priority policy for one or more input/output (I/O) request class types.

In one example of a data storage system, the memory controller is configured to use an offline I/O classification thread in association with one or more I/O requests that are currently being processed.

In one example of a data storage system, the memory controller comprises logic further configured to forward metadata and the one or more I/O contexts of the one or more I/O requests that are currently being processed to the offline I/O classification thread using an inter process communications channel (IPC).

In one example of a data storage system, the memory controller is configured to:

read the one or more I/O contexts and metadata of the one or more I/O requests;

analyze the one or more I/O contexts and metadata of the one or more I/O requests; and update, at a selected time interval, the I/O context association table according to the one or more I/O contexts and metadata that is analyzed; and redefine the caching and processing priority policy for executing one or more subsequent I/O requests according to the updated I/O context association table.

In one example of a data storage system, wherein the memory controller comprises logic further configured to extract the caching and processing priority policy from the I/O context association table in order to process the one or more I/O requests.

In one example of a data storage system, wherein the memory controller comprises logic further configured to extract the redefined caching and processing priority policy from the updated I/O context association table in order to process the one or more subsequent I/O requests.

In one example of a data storage system, wherein the memory controller is configured to analyze the one or more I/O class types according to I/O context and metadata of historically executed I/O requests to define the caching and processing priority policy.

In one example of a data storage system, wherein the memory controller is configured to classify the one or more I/O requests into the I/O classes based on at least one of data accesses patterns, data types, data storage types associated with the one or more I/O requests, I/O context call instructions, I/O context call parameters, metadata, and one or more read or write operation types.

In one example of a data storage system, wherein the memory controller comprises logic further configured to differentiate cold data and hot data, prior to caching the cold data or the hot data, according to the caching and processing priority policy of the one or more I/O class types.

In one example of a data storage system, wherein the memory controller comprises logic further configured to differentiate cold data and hot data, prior to writing the cold data or the hot data to a tiered storage system, according to the caching and processing priority policy of the one or more I/O class types.

In one example of a data storage system, wherein the memory controller comprises logic further configured to differentiate file system metadata write operations and file data write operations according to the caching and processing priority policy of the one or more I/O class types.

In one example of a data storage system, further comprising the protected memory, wherein the protected memory is an error correction code protected memory, a scratchpad memory, a cache, an on-chip memory, or an off-chip memory, byte addressable memory, memory devices that use chalcogenide phase change material, multi-threshold level NAND flash memory, NOR flash memory, single or multi-level PCM, a resistive memory, nanowire memory, ferroelectric transistor random access memory (FeTRAM), magnetoresistive random access memory (MRAM) memory that incorporates memristor technology, or spin transfer torque (STT)-MRAM.

In one example of a data storage system, further comprising one or more of:

the NVM, the NVM communicatively coupled to the memory controller;

a processor communicatively coupled to the memory controller;

a network interface communicatively coupled to a processor;
a display communicatively coupled to a processor; or
a battery coupled to a processor.

In one example there is provided, a method comprising:
under control of at least one processor and memory configured with executable instructions that:
define caching and processing priority policies for one or more input/output (I/O) request class types;
analyze one or more I/O contexts of one or more I/O requests;
associate the one or more I/O contexts with one or more I/O class types using an I/O context association table for executing the one or more I/O requests according to the caching and processing priority policies;
execute the one or more I/O requests according to the caching and processing priority policies of the one or more I/O class types;
update the I/O context association table according to the one or more I/O contexts and metadata of the one or more I/O requests that have been processed in order to update the caching and processing priority policies for executing one or more subsequent I/O requests.

In one example of a method, wherein the executable instructions further: extract one or more I/O contexts of one or more I/O requests upon receiving one or more I/O requests.

In one example of a method, wherein the executable instructions further: use an offline I/O classification thread in association with one or more I/O requests that are currently being processed.

In one example of a method, wherein the executable instructions further: forward metadata and the one or more I/O contexts of the one or more I/O requests that are currently being processed to the offline I/O classification thread using an inter process communications channel (IPC).

In one example of a method, wherein the executable instructions further:
read the one or more I/O contexts and metadata of the one or more I/O requests;
analyze the one or more I/O contexts and metadata of the one or more I/O requests;
update, at a selected time interval, the I/O context association table according to the one or more I/O contexts and metadata that is analyzed; and
redefine the caching and processing priority policy for executing one or more subsequent I/O requests according to the updated I/O context association table.

In one example of a method, wherein the executable instructions further: extract the caching and processing priority policy from the I/O context association table in order to process the one or more I/O requests.

In one example of a method, wherein the executable instructions further: classify the one or more I/O requests into the I/O classes based on at least one of data accesses patterns, data types, data storage types associated with the one or more I/O requests, I/O context call instructions, I/O context call parameters, metadata, and one or more read or write operation types.

While the forgoing examples are illustrative of the principles of invention embodiments in one or more particular applications, it will be apparent to those of ordinary skill in the art that numerous modifications in form, usage and details of implementation can be made without the exercise of inventive faculty, and without departing from the principles and concepts of the disclosure.

What is claimed is:

1. An apparatus, comprising:
a memory controller with circuitry configured to:
classify one or more input/output (I/O) requests according to I/O classes;
associate one or more I/O contexts extracted from the one or more I/O requests; to each of the I/O classes;
assign a caching and processing priority policy to each of the I/O classes, wherein the memory controller is configured to use an I/O context association table to associate the one or more I/O contexts to each of the I/O classes in order to update the caching and processing priority policy for one or more subsequent I/O requests;
execute the one or more I/O requests according to the caching and processing priority policy; and
an interface to the memory controller.

2. The apparatus of claim 1, wherein the memory controller is configured to extract the one or more I/O contexts from the one or more I/O requests.

3. The apparatus of claim 1, wherein the memory controller comprises logic further configured to use an offline I/O analytics process, independent from the one or more I/O requests, using shared memory data structures, wherein the shared memory data structures include at least the I/O context association table and an inter process communications channel.

4. The apparatus of claim 3, wherein the memory controller comprises logic further configured to transfer the one or more I/O contexts of the one or more I/O requests that have been processed to an I/O analytics thread.

5. The apparatus of claim 1, wherein the memory controller comprises logic further configured to:
read the one or more I/O contexts of the one or more I/O requests;
analyze the one or more I/O contexts; and
update the I/O context association table; and
update the caching and processing priority policy according to the updated I/O context association table for the one or more subsequent I/O requests.

6. The apparatus of claim 1, wherein the memory controller is configured to classify the one or more I/O requests into the I/O classes based on at least one of data accesses patterns, data types, data storage types associated with the one or more I/O requests, I/O context call instructions, I/O context call parameters, metadata, or one or more read or write operation types.

7. The apparatus of claim 1, further comprising a memory, wherein the memory comprises one or more of a scratchpad memory, an on-chip memory, or an off-chip memory, byte addressable memory, memory devices that use chalcogenide phase change material, multi-threshold level NAND flash memory, NOR flash memory, single or multi-level PCM, a resistive memory, nanowire memory, ferroelectric transistor random access memory (FeTRAM), magnetoresistive random access memory (MRAM) memory that incorporates memristor technology, or spin transfer torque (STT)-MRAM.

8. The apparatus of claim 1, further comprising one or more of:
a non-volatile memory (NVM), the NVM being communicatively coupled to the memory controller;
a processor communicatively coupled to the memory controller;
a network interface communicatively coupled to a processor;

a display communicatively coupled to a processor; or
a battery coupled to a processor.

9. A data storage system comprising:
a memory controller comprising logic to:
define a caching and processing priority policy for one or more input/output (I/O) request class types;
monitor one or more I/O contexts of one or more I/O requests;
associate the one or more I/O contexts with one or more I/O class types using an I/O context association table;
extract the caching and processing priority policy from the I/O context association table in order to process the one or more I/O requests;
execute the one or more I/O requests according to the caching and processing priority policy of the one or more I/O class types; and
an interface to the memory controller.

10. The data storage system of claim 9, wherein the memory controller is configured to execute an I/O context extraction call operation to extract an I/O context from the one or more I/O requests upon receiving the one or more I/O requests.

11. The data storage system of claim 10, wherein the memory controller comprises logic further configured to analyze a I/O call context, one or more I/O call parameters, I/O calling thread parameters and metadata of the one or more I/O requests in order to assign the caching and processing priority policy for one or more input/output (I/O) request class types.

12. The data storage system of claim 9, wherein the memory controller is configured to use an offline I/O classification thread in association with one or more I/O requests that are currently being processed.

13. The data storage system of claim 12, wherein the memory controller comprises logic further configured to forward metadata and the one or more I/O contexts of the one or more I/O requests that are currently being processed to the offline I/O classification thread using an inter process communications channel (IPC).

14. The data storage system of claim 9, wherein the memory controller is configured to:
read the one or more I/O contexts and metadata of the one or more I/O requests;
analyze the one or more I/O contexts and metadata of the one or more I/O requests; and
update, at a selected time interval, the I/O context association table according to the one or more I/O contexts and metadata that is analyzed; and
redefine the caching and processing priority policy for executing one or more subsequent I/O requests according to the updated I/O context association table.

15. The data storage system of claim 14, wherein the memory controller comprises logic further configured to extract the redefined caching and processing priority policy from the updated I/O context association table in order to process the one or more subsequent I/O requests.

16. The data storage system of claim 9, wherein the memory controller is configured to analyze the one or more I/O class types according to I/O context and metadata of historically executed I/O requests to define the caching and processing priority policy.

17. The data storage system of claim 9, wherein the memory controller is configured to classify the one or more I/O requests into the one or more I/O class types based on at least one of data accesses patterns, data types, data storage types associated with the one or more I/O requests, I/O context call instructions, I/O context call parameters, metadata, and one or more read or write operation types.

18. The data storage system of claim 9, wherein the memory controller comprises logic further configured to differentiate cold data and hot data, prior to caching the cold data or the hot data, according to the caching and processing priority policy of the one or more I/O class types.

19. The data storage system of claim 9, wherein the memory controller comprises logic further configured to differentiate cold data and hot data, prior to writing the cold data or the hot data to a tiered storage system, according to the caching and processing priority policy of the one or more I/O class types.

20. The data storage system of claim 9, wherein the memory controller comprises logic further configured to differentiate file system metadata write operations and file data write operations according to the caching and processing priority policy of the one or more I/O class types.

21. The data storage system of claim 9, further comprising one or more of:
a non-volatile memory (NVM), the NVM being communicatively coupled to the memory controller;
a processor communicatively coupled to the memory controller;
a network interface communicatively coupled to a processor;
a display communicatively coupled to a processor; or
a battery coupled to a processor.

22. A method comprising:
under control of at least one processor and memory configured with executable instructions that:
define caching and processing priority policies for one or more input/output (I/O) request class types;
analyze one or more I/O contexts of one or more I/O requests;
associate the one or more I/O contexts with one or more I/O class types using an I/O context association table for executing the one or more I/O requests according to the caching and processing priority policies;
execute the one or more I/O requests according to the caching and processing priority policies of the one or more I/O class types;
update the I/O context association table according to the one or more I/O contexts and metadata of the one or more I/O requests that have been processed in order to update the caching and processing priority policies for executing one or more subsequent I/O requests.

23. The method of claim 22, wherein the executable instructions further extract one or more I/O contexts of one or more I/O requests upon receiving one or more I/O requests.

24. The method of claim 22, wherein the executable instructions further use an offline I/O classification thread in association with one or more I/O requests that are currently being processed.

25. The method of claim 24, wherein the executable instructions further forward metadata and the one or more I/O contexts of the one or more I/O requests that are currently being processed to the offline I/O classification thread using an inter process communications channel (IPC).

26. The method of claim 22, wherein the executable instructions further:
read the one or more I/O contexts and metadata of the one or more I/O requests;

analyze the one or more I/O contexts and metadata of the one or more I/O requests;

update, at a selected time interval, the I/O context association table according to the one or more I/O contexts and metadata that is analyzed; and redefine the caching and processing priority policy for executing one or more subsequent I/O requests according to the updated I/O context association table.

27. The method of claim 22, wherein the executable instructions further extract the caching and processing priority policy from the I/O context association table in order to process the one or more I/O requests.

28. The method of claim 22, wherein the executable instructions further classify the one or more I/O requests into the one or more I/O class types based on at least one of data accesses patterns, data types, data storage types associated with the one or more I/O requests, I/O context call instructions, I/O context call parameters, metadata, and one or more read or write operation types.

* * * * *